Oct. 6, 1936. T. L. DUNBAR Re. 20,123
PROCESS AND APPARATUS FOR DIGESTING FIBROUS MATERIALS
Original Filed April 21, 1930
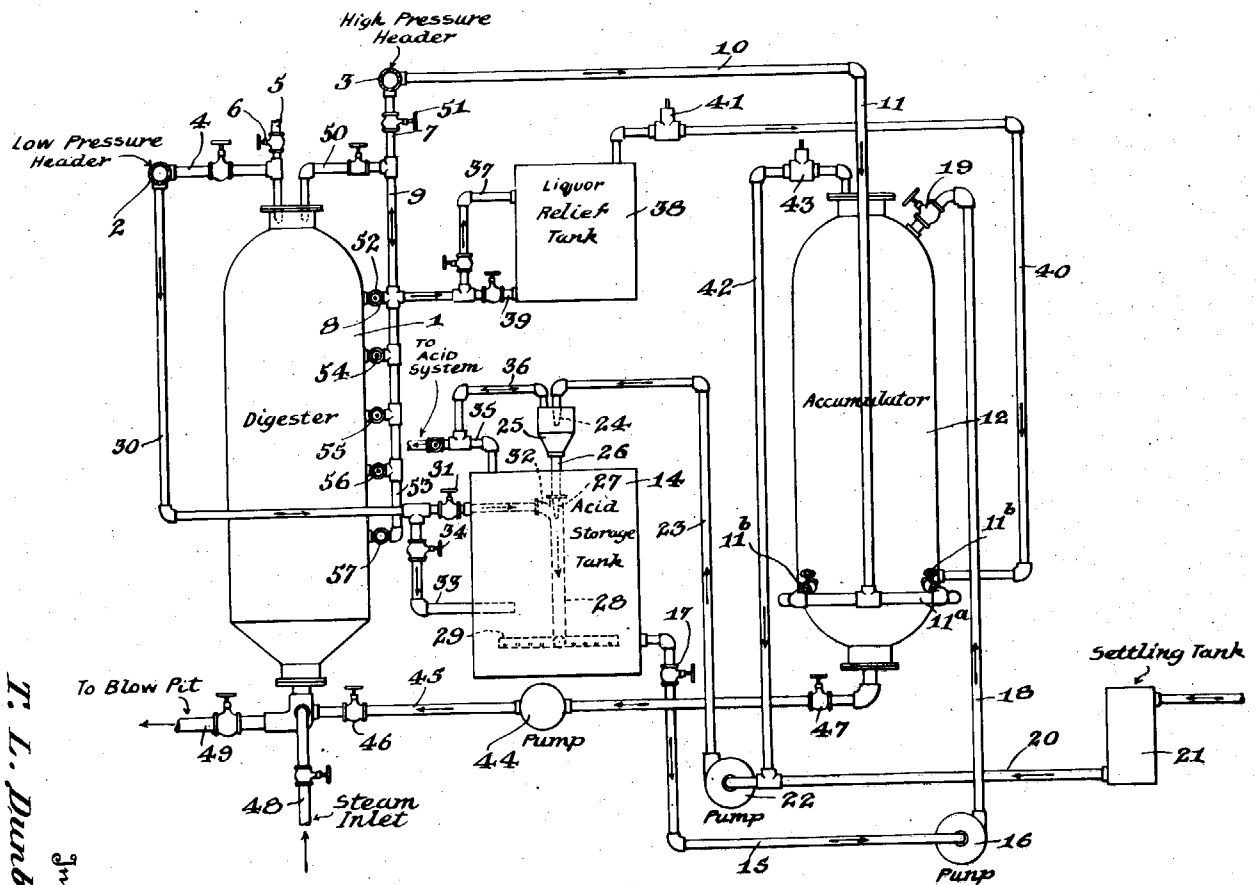
Inventor
T. L. Dunbar
By Robert E. Barry
Attorney Reissued Oct. 6, 1936

Re. 20,123

UNITED STATES PATENT OFFICE 20,123

PROCESS AND APPARATUS FOR DIGESTING FIBROUS MATERIALS

Thomas L. Dunbar, Watertown, N. Y., assignor to Chemipulp Process Inc., Watertown, N. Y., a corporation of New York Original No. 1,859,384, dated May 24, 1932, Serial No. 446,046, April 21, 1930. Application for reissue May 23, 1934, Serial No. 727,205

50 Claims. (Cl. 92—11)

The present invention pertains to the digestion of fibrous material such as wood chips for example, to be used in the making of paper or the like, and the main object of the invention is to provide an improved system for recovering acid gases and the heat units thereof, and to thereby reduce the consumption of steam and to shorten the time required for the digestion of such fibrous materials.

During the greater part of the life of the industry, after chips or the like have been deposited in the digester, cold acid liquor was introduced into the digester to saturate the fibrous material. Afterwards, steam was turned into the bottom of the digester, and as the contents were heated up, gases and vapors were evolved, and these were led off to some suitable point of disposal. Such a system required the use of steam from the beginning to substantially the end of the cook, and permitted the waste of the gases and the heat units impounded therein. Later, proposals were made to recover the gases and to employ the same to strengthen and heat raw acid liquor in an accumulator, and from the latter, the preheated and preconditioned liquor was fed into a digester containing raw fibrous material. Even in these later proposals, the digester was only partially filled with liquor and chips, and a gas space remained above the liquor level.

In a still further proposal, after the chips have been placed in the digester, and the top of the latter has been sealed by means including a pressure operated valve. the preheated and preconditioned liquor is forced into the digester until the pressure becomes sufficient to open the pressure valve and relieve the digester of the pressure. However, in that arrangement, there is no provision for venting off air into the atmosphere during the time that the digester is being filled with liquor, and as air has a deleterious effect on the acid, such as producing insoluble sulfates which lime up the equipment, as well as causing a loss of the sulphur which is in combination with the sulphates, it is advantageous to vent such air from the digester during the filling of the same. Furthermore, in the arrangement employing the pressure valve, no provision is made for relieving the digester of $SO_2$, as soon as it occurs at the top of the digester, and consequently, an additional burden is placed on the liquor pump. In addition, it will be observed that a system of this character prevents the digester from being entirely or completely filled with liquor, due to the fact that air and gases are trapped at the top of the digester.

Another object of my invention is to provide a system whereby a digester may be charged with chips to a level in close proximity to the top of the digester, and then preconditioned liquor heated to a temperature of 40° C., or more, may be pumped into the digester. As the liquor rises in the digester, air is relieved from the top of the latter, and as soon as the $SO_2$ appears, (which can be detected by the odor of the same), the air vent is closed and the gas is diverted into the acid liquor storage tank to be absorbed by the acid liquor. Any gas remaining unabsorbed is returned from the storage tank to the suction side of the liquor pumps in the acid producing system. As soon as the digester has been relieved of the gas during the filling operation, and liquor begins to flow from the top of the digester, the top of the digester is sealed, and then the pump used for filling the digester with liquor is continued in operation until a pressure of up to 300 pounds per square inch is pumped on the contents of the digester. Obviously, this causes the liquor to penetrate the chips and the hot acid puts into partial solution the non-cellulose components of the raw material, and this allows a more rapid and thorough penetration of the raw material.

Another object is to save the $SO_2$ gas just as soon as it appears at the top of the digester. As I completely fill the digester with acid at a temperature of from 40° C., to 135° C., the $SO_2$ gas and/or liquor appears at the top of the digester considerably sooner than when filling with cold acid.

Another object of the invention is to furnish a system in which the digesters are provided with a liquor relief tank which may receive gas and/or liquor relieved from one or more of the digesters, this strong hot liquor being used in a subsequent cook to pretreat the fibrous material as it is introduced into a digester, and to pack said fibrous material into the digester.

With the foregoing objects outlined and with other objects in view which will appear as the description proceeds, the invention consists in the novel features hereinafter described in detail, illustrated in the accompanying drawing, and more particularly pointed out in the appended claims.

The accompanying drawing shows in side elevation, the novel apparatus forming part of my system.

In this drawing, 1 designates a digester, 2 the conventional low pressure relief header, and 3 the high pressure relief header. The headers, as is customary, extend along the upper portions of a series of digesters, but as the present invention may be explained in connection with a single digester, only one digester has been illustrated, it being understood that the invention may be used with one or more such digesters.

In accordance with this invention, a valved low pressure branch pipe 4 connects the top portion of the digester to the header 2, but for the purpose of the invention, this branch is furnished with an air outlet vent pipe 5, having a control valve 6.

The top of the digester is also connected by valved branch pipes 50 and 7, to the high pressure header 3, and I again depart from the conventional by connecting the valved side relief branch pipe 8 to the pipe 7 by means of a by-pass 9.

In order that relief fluids from the header 3 may be utilized to preheat and strengthen the acid liquor, the header 3 is provided with a conduit 10 which communicates with the down pipe 11 that terminates in a distributor header 11a; valved branches 11b being led from this distributor header into the accumulator at predetermined points, these valved branches being located in elevation near the bottom of the accumulator 12. The number of valved branches and their exact location is determined by the size of the accumulator, and for small accumulators, I have found that it is only necessary to use one nozzle entrance, but for larger sizes, it is sometimes necessary to use as many as five.

Acid liquor is fed to the accumulator from a storage tank 14 that is provided with an outlet pipe 15 leading to the suction side of a pump 16, and having a control valve 17. The pump forces the liquor through a riser 18 which empties into the upper portion of the accumulator and is provided at its upper portion with a control valve 19. In this way, liquor may be showered into the accumulator to absorb the gas and condense the vapors entering by way of pipe 11, or the pump 16 may be intermittently operated so as to place a pool of acid liquor in the accumulator into which the relief fluid from the high pressure header is introduced from the distributor 11a.

The acid liquor from the preparation apparatus may enter my system by way of a pipe line 20 which is provided with the usual settling tank 21, and this liquor is forced by a pump 22, through a pipe 23 that terminates in a nozzle 24 which discharges the liquor into a closed substantially cone-shaped chamber 25 arranged at the top of a down pipe 26. This pipe also terminates in an ejector nozzle 27 which enters a distributor tube 28, provided at its lower end with a perforated distributor 29; the parts 28 and 29 being arranged within the acid storage tank, so that a pool of liquor may be maintained in the tank. While the ejector nozzle 27 is shown within the tank, it may be positioned outside the same.

A conduit 30, having a control valve 31, leads from the low pressure header 2 to an inlet 32 arranged on the side of the distributor tube, adjacent the injector nozzle 27, whereby liquor forced into the storage tank by means of the pump 22, will act to exert suction in the line 30, so as to cause low pressure gases and vapors to be sucked into and mixed with the cold liquor flowing to the storage tank.

During the filling of the digester with hot acid liquor, as heretofore mentioned, as soon as $SO_2$ gas appears at the top of the digester, it may flow through the branch 4 and header 2, into the pipe 30, but at such time, the valve 31 is closed, and this gas is introduced into the liquor in the storage tank by way of a by-pass pipe 33 having a control valve 34. Any uncondensed gases tending to gather in the top portion of the closed storage tank are withdrawn by means of a pipe 35 which leads to the suction or discharge side of the gas fan, supplying $SO_2$ burner gas to the acid preparation system.

As some gas may be released in the chamber 25, I connect the top of this chamber by a pipe 36 to the pipe 35, so that this gas may also be fed to the suction or discharge side of said gas fan.

In one method of operating, relief liquor instead of being discharged through the pipe 9, travels through the branch 8 to a valved conduit 37 which leads the same into the upper portion of a relief tank 38 which preferably has a capacity about one-third as large as that of the digester.

As will be hereinafter explained, hot strong relief liquor from the tank 38 may be returned to the digester by means of a valved pipe 39, which is connected to the valved branch 8. A pipe 53 extends downwardly directly below pipe 9, with valved branches 54, 55, 56 and 57 leading to the digester at various elevations, whereby while the digester is being filled with chips, the liquor from the relief tank 38 may be admitted at different points along the vertical height of the digester. For instance, when the filling of the digester is first started, valve 57 will be opened and then after the chip level has raised beyond valve 57, that valve will be closed, and valve 56 will be opened, and so on until the end of the filling operation, when the relief liquor will be going in through valve 52.

For the purpose of relieving the tank 38 of gases and entrained vapors, and to save such fluid and the heat units impounded therein, I connect the top of the tank 38 to the lower portion of the accumulator by means of a pipe 40, and in this pipe, I interpose a pressure relief valve 41 which is set to open at a predetermined pressure, whereby, when the pressure in the tank 38 rises to this predetermined level, the gases and vapors will be automatically relieved from the liquor relief tank, and flow into the accumulator to be absorbed or condensed by the liquor in the latter.

As the pressure rises in the accumulator, it will be necessary to relieve the same of such pressure, so as to prevent this pressure from rising above a predetermined maximum. To accomplish such relief, I connect the top of the accumulator by means of a conduit 42, to the pipe 20 which enters the suction side of the pump 22, and in the conduit 42, I arrange a pressure controlled valve 43.

From the above it will be seen that acid gas from the digesters may flow through the pipe 30 and be recovered by the liquor in the storage tank 14, and in this way the liquor is strengthened and heated to some extent. Then this preconditioned and preheated liquor is forced by the pump 16, into the accumulator to be further strengthened and heated by relief fluids from the high pressure header, and consequently, the strengthened liquor is heated to a temperature say ranging from 40° C. to 130° C., and after the liquor has been prepared in this way, it is fed from the bottom of the accumulator by means of a pump 44 interposed in a conduit 45 which has control valves 46 and 47 arranged respectively adjacent to the lower ends of the digester and accumulator. In this way, the hot acid liquor is forced into the digester after the latter has been charged with chips or other raw material.

Each digester may have the conventional valved steam inlet means 48, and the valved outlet pipe 49, the latter leading to the blow-pit not shown.

In one method of operating in accordance with the invention, and assuming that acid liquor in the accumulator has been strengthened and preheated in the manner heretofore described, and that the digester is empty. At such time, the valve 46 and the valves in the pipes 4, 5, 7, 9, 37, 39, 48 and 49 are closed. Wood chips or other fibrous material are then fed into the top of the digester until they build up to a level in close proximity to the top of the digester. Now the cover of the digester is fastened in place, the air valve vent 6 is opened, and the valves 46 and 47 are opened, and the pump 44 is started, so as to force the hot strong acid liquor from the accumulator into the digester. As soon as all air is discharged from the digester, and $SO_2$ gas appears, the valve 6 is closed, and the valve in the branch 4 is opened. At this time, the valve 31 is also closed, and the valve 34 is opened, so that the gas relieved from the digester flows into the pool of liquor in the tank 14 to be absorbed thereby. Any gas remaining unabsorbed, goes by way of pipe 35, back to the acid preparation system, as heretofore mentioned.

As soon as all of the acid gas has been discharged from the digester, and liquor begins to flow through the branch 4, the valve in that branch, and the valve 34 are closed, so that the entire upper end of the digester is now sealed, but the pump 44 is permitted to continue to operate, and it is kept running until the digester is not only completely filled by the liquor and chips, but until a desired pressure has been pumped on the digester. I have found in actual practice, the digesting process is immediately started when the digester is filled with acid of a temperature of 40° C., or over, and when I say this, I mean that the hot acid puts into partial solution the non-cellulose components of the raw material which are commonly called water solubles, and this allows a more thorough and rapid penetration of the fibrous material.

As soon as the pressure has been pumped on the digester, steam is admitted to same through the pipe 48. The digester is brought up to a pressure of from 50 to 75 pounds in from one to three hours, varying in respect to the length of the cook. After the desired pressure has been reached, the top relief valve in branch 50, and valve 51 are partially opened and relief is carried on, until an approximate temperature of 115° C. has been reached, then the top relief is closed, and the side relief valve 52 in branch 8 is partially opened, then the digester is relieved until an approximate temperature of 125° C. has been reached. Then the side relief valve is closed, and the top relief valve in branch 50 opened. If the top relief valve picks up liquor, the side relief is again opened for further drainage. The temperatures cited will vary considerably in relation to the length of cooking time and strength of acid.

My reason for bringing the liquor through the top relief 7 until a temperature of 115° C., has been reached, is because the admittance of steam in the bottom of the digester condenses and makes additional liquor, and as this liquor is forced through the top of the digester, I make the same travel through, and therefore, come in contact with more of the raw material contents of the digester. Consequently, I make the liquor do more work than it would if relieved through the side relief 8 at the time steam is turned into the digester. In other words, as the digester is completely full of fibrous material and liquor when the steam is turned into the same, I am able to more evenly distribute the heat units and keep the fibrous material more thoroughly saturated by relieving through the top relief than I would if I relieved through the side relief 8.

I have found with a standard size digester, that by the time I have relieved all the liquor from a level above the side relief 8, (the latter being 8 to 10 feet below the top flange of the digester), the temperature in the digester rises to 125° C., owing to the continued relieving of gases, and the introduction of steam. As soon as the temperature 125° C. has been reached, and the liquor level has been brought down so that it is approximately eight feet below the top of the digester, the side relief branch 8 is closed, and the top high pressure relief branch 7 is again opened, so that gases and vapors are relieved through the header 3 and pipes 10 and 11, until the pressure between the digester and the accumulator is equalized, whereupon the valve in the branch 7 is closed, and the valve in the branch 4, and the valve 31 are again opened, whereby the low pressure relief fluid passes into the tube 28 where it is mixed and absorbed by the liquor discharging from the injector nozzle 27.

In this way, liquor in the storage tank 14, and the accumulator 12, is strengthened, and the liquor in the accumulator is highly heated, so that liquor thus preconditioned may be fed into another digester which has just been charged with chips, and the operation may be again repeated.

In an alternative method of operation the system, the digester is filled with chips in the usual manner, and then the valves 46, 47 are opened, and the pump 44 is started, whereupon hot fully conditioned acid is taken out of the accumulator and pumped into the digester. At such time, all of the digester connections, with the exception of the one 5, are closed, and consequently, as the liquor flows into the digester, the air escapes. As soon as the air has been discharged, the valve 6 is closed, and any $SO_2$ gas now escaping, due to the filling of the digester, is permitted to flow through the pipes 30 and 33, into the liquor in the tank 14. When the digester is completely filled with liquor and chips, the valve 34 and the valve in the branch 4 are closed, and the pumping is continued until the required pressure has been placed on the digester. Then the acid filling pump 44 is stopped and the valves 46 and 47 are closed, and if the accumulator is filled intermittently, the pump 16 is started, and the valves 17 and 19 are opened, and the accumulator is filled to the required height with partially conditioned acid from the tank 14.

As soon as the pressure has been pumped on the digester, the steam is admitted through the pipe 48, and after a suitable time, the valve in the pipe 37 is opened, so that liquor, due to the pressure existing in the digester, flows into the liquor relief tank 38, either through pipes 50, 9, and 37, or 8 and 37, or through all of these pipes, depending on whether the valves therein are opened or closed. The operation of the drawing off relief gas and/or liquor in this manner is continued until enough liquor has been withdrawn to leave a suitable gas space in the top of the digester, whereby when the valve 51 in the branch 7 is opened, so-called "dry gas" will be relieved into the high pressure header 3. At such time, the valve in the branch 37 is closed.

When a sufficient amount of liquor has been relieved into the tank 38 to allow so-called "dry gas" to escape through branch 7, the contents of the digester are then cooked in the usual manner, and the valve in the branch 7 is left open so that the "dry gas" passes through the header 3 and pipes 10 and 11, into the accumulator where it acts to heat and enrich the acid liquor contained therein, and thus prepares such liquor for use in the digester which is to be filled.

At the last end of the cook, the pressure on the digester is brought down to a point where it equalizes with the pressure in the accumulator, and the pressure in the latter is kept at a maximum of 35 pounds, by the pressure operated valve 43. Then, when the pressures in the digester and accumulator are equalized, the valve in the branch 7 is closed, and the valve in the branch 4, as well as valve 31, are opened, whereby low pressure gases and vapors may be sucked out through the pipe 30 by means of the jet of acid liquor discharging from the injector nozzle 27. This suction action is continued until the pressure in the digester has been lowered sufficiently to permit blowing of the digester, then the valve in the branch 4 and the valve 31 are closed, and the valve in the pipe 49 is opened, and the contents of the digester are pumped into the blow-pit.

The tank 38 is heat insulated, and during the cooking operation, the valve 41 is set so as to maintain the proper pressure in said tank. Whenever the pressure rises above a predetermined point, the valve 41 opens and permits the released gas to flow over into the accumulator, through the pipe 40.

As soon as the digester has been emptied, it is again immediately filled with chips or other fibrous material, and during the time of filling, the valve in branch 37 is closed, and the valve in branch 39 is opened. Consequently, the hot acid relief liquor from tank 38 is showered back through pipe 53 on top of the chips as they fall into the digester, thereby accomplishing two results. First, this hot liquor returning under pressure into the digester, sprays over the chips and packs them more solidly in the digester, thereby taking the place of numerous steam devices previously used for this purpose. Second, the hot liquor spraying into the digester through branches 57, 56, 55, 54, 52, conditions the chips so that they are very nearly of the same moisture content, and in addition, as hot liquor is used for this purpose, partial penetration is immediately accomplished and a good many of the so-called water solvents are removed from the chips. All of this means that more chips are placed in the digester, considerably more production is made with every cook, and in addition, the chips are conditioned so that more uniform results are obtained, as well as action is started in dissolving the non-cellulose material in the fibrous material processed.

Each of the digesters of the plant may be equipped with a relief tank 38, or where there are many digesters in the plant, a single relief tank can be used for as many digesters as the cooking schedule will permit.

I believe I am the first to separate the relief liquor from the main pool of liquor in the digester, and to conduct the hot gases from such relief liquor, into a pool of liquor under pressure, and to then reuse the hot relief liquor for packing chips in the digester, and also for starting the dissolving action and conditioning the chips for further treatment. It is also novel, I believe, to have the overhead line 42 from the accumulator connected to the suction side of the pump 22 which forces the liquor to the acid storage tank. It will also be clear to those skilled in the art that I depart from the usual procedure in a number of important particulars, and in doing so, I gain many advantages over the systems heretofore known.

While I have disclosed what I now consider to be a preferred embodiment of the invention in such manner that the same may be readily understood by those familiar with the digesting of fibrous material, I am aware that changes may be made in the details disclosed, without departing from the spirit of the invention, as expressed in the claims.

What I claim and desire to secure by Letters Patent is:

1. In the digestion of fibrous material, introducing acid liquor into a digester while discharging air to the atmosphere from the digester through an air vent until acid gas appears, and as soon as said gas commences to escape from the digester undergoing filling, immediately closing said air vent and recovering said gas.

2. In the digestion of fibrous material, introducing hot acid liquor into a digester while discharging air to the atmosphere from the digester through an air vent until acid gas appears, and as soon as said gas commences to escape from the digester undergoing filling, immediately closing said air vent and recovering said gas.

3. In the digestion of fibrous material, charging a digester with fibrous material, and then completely filling the remaining space in the digester with acid liquor at a temperature of 40° C. or more by pumping said liquor into the digester.

4. In the digestion of fibrous material, charging a digester with such material, and then completely filling the remaining space in the digester with acid liquor at a temperature ranging from 40° C. to 135° C., both inclusive, by pumping said liquor into the digester.

5. In the digestion of fibrous material, completely filling a digester with fibrous material and hot chemical liquor, sealing the digester, and then pumping hot chemical liquor into the digester until the contents of the digester are placed under super-atmospheric pressure.

6. In the digestion of fibrous material, completely filling a digester with fibrous material and hot chemical liquor, sealing the digester, and then pumping hot chemical liquor into the digester until the contents of the digester are placed under super-atmospheric pressure of at least 15 pounds.

7. In the digestion of fibrous material, charging a digester with such material, then introducing acid liquor into the digester to completely fill the latter, discharging air from the digester during the filling until acid gas commences to escape, then recovering the acid gas until the digester is completely filled with liquor, then sealing the digester and pumping acid liquor into the digester until the contents thereof reaches a super-atmospheric pressure.

8. In the digestion of fibrous material, charging a digester with such material, then introducing acid liquor into the digester to completely fill the latter, discharging air from the digester during the filling until acid gas commences to escape, then recovering the acid gas until the digester is completely filled with liquor, then sealing the digester and pumping acid liquor into the digester until the contents thereof reaches a super-atmospheric pressure of up to 300 pounds.

9. In the digestion of fibrous material, charging a digester with such material, then introducing hot acid liquor into the digester to completely fill the latter, discharging air from the digester during the filling until acid gas commences to escape, then recovering the acid gas until the digester is completely filled with liquor, then sealing the digester and pumping acid liquor into the digester until the contents thereof reaches a super-atmospheric pressure.

10. In the digestion of fibrous material, charging a digester with such material, then introducing hot acid liquor into the digester to completely fill the latter, discharging air from the digester during the filling until acid gas commences to escape, then recovering the acid gas until the digester is completely filled with liquor, then sealing the digester and pumping acid liquor into the digester until the contents thereof reaches a super-atmospheric pressure of up to 300 pounds.

11. In the digestion of fibrous material, completely filling a digester with fibrous material and chemical liquor, sealing the digester and then pumping acid liquor into the digester until the contents of the digester reaches a pressure above 15 pounds, then discontinuing the pumping and introducing steam into the digester, and at about the same time releasing acid liquor from the digester and contacting the released acid liquor with other acid liquor to recover the released liquor.

12. In the digestion of fibrous material, completely filling a digester with fibrous material and hot acid liquor, sealing the digester, then pumping acid liquor into the digester until a pressure above 15 pounds is reached in the digester, then discontinuing the pumping and introducing steam into the digester, and about the time of the introduction of the steam, releasing acid liquor from the digester and introducing the released liquor into a pool of acid liquor contained in a pressure accumulator.

13. In the digestion of fibrous material, completely filling a digester with fibrous material and acid liquor having a temperature within a range of 40° C. to 135° C., sealing the digester, pumping hot acid liquor into the digester until the pressure therein reaches up to 300 pounds, then discontinuing the pumping and introducing steam into the digester, and subsequently passing hot relief fluid from the upper portion of the digester into acid liquor in a pressure accumulator.

14. In the digestion of fibrous material, completely filling a digester with such material, and hot acid liquor, discharging during the filling, acid gas from the upper portion of the digester, into fresh acid liquor in a storage tank, sealing the digester after it is completely filled, then pumping hot acid liquor into the digester until a pressure of up to 300 pounds is reached in the digester, then discontinuing the pumping and introducing steam into the digester, and subsequently passing relief fluid from the upper portion of the digester into acid liquor in a closed accumulator.

15. In a process of the character described, discharging hot relief fluid from a digester into acid liquor in a pressure accumulator, pumping acid liquor to a storage tank, and utilizing the pumping force to withdraw acid gas from the accumulator and to mix the same with the acid liquor pumped to the storage tank.

16. In a process of the character described, passing hot relief fluid from a digester undergoing cooking, and mixing the same with acid liquor in a pressure accumulator, forcing a stream of fresh acid liquor to a storage tank, and releasing acid gas from the accumulator when a predetermined pressure is reached in the latter, and introducing the last mentioned gas into the stream of fresh acid liquor flowing to the storage tank.

17. In a process of the character described, utilizing a stream of acid liquor forced into a storage tank to withdraw relief fluids from a digester and a pressure accumulator, and to mix the withdrawn fluids with the pumped acid liquor.

18. In a process of the character described, passing hot relief fluid from a digester undergoing cooking, into acid liquor in a pressure accumulator, pumping fresh acid liquor to a storage tank, utilizing the pump to mix acid gas released from the accumulator with the liquor flowing to the storage tank, and pumping acid liquor from the storage tank into the accumulator.

19. In a process of the character described, passing hot relief fluid from a digester undergoing cooking, into acid liquor in a pressure accumulator, pumping fresh acid liquor to a storage tank, utilizing the pump to mix acid gas released from the accumulator with the liquor flowing to the storage tank, pumping acid liquor from the storage tank into the accumulator, and utilizing hot acid liquor from the accumulator for digesting fibrous material.

20. In a process of the character described, completely filling a digester with hot acid liquor and fibrous material, then releasing hot acid liquor from the digester at the top of the same, and introducing the released liquor into a pressure tank, and subsequently using the relief liquor from said pressure tank to pack fibrous material into the digester during the filling of the latter and to precook the fibrous material as it is introduced in the digester.

21. In the digestion of fibrous material, completely filling a digester with hot acid liquor and fibrous material under pressure, releasing acid liquor through the side relief of the digester, and depositing the same in a pressure tank, and subsequently using hot relief liquor from said tank to pack fibrous material into a digester and to precook the last mentioned fibrous material.

22. In a process of the character described, releasing side relief liquor from a digester completely filled with hot acid liquor and fibrous material, allowing this relief liquor to flow into an elevated pressure tank, and subsequently allowing said hot relief liquor to flow from said tank under the pressure existing in the latter, into the digester while charging the latter with fibrous material, whereby said fibrous material is precooked and packed into the digester.

23. In a process of the character described, permitting hot acid liquor to flow from the upper portion of a digester, into an elevated relief pressure tank, and subsequently utilizing hot relief liquor from said tank by flowing said liquor into the digester while filling the latter with fibrous material, whereby said fibrous material is precooked and packed into the last mentioned digester.

24. In a process of the character described, completely filling a digester with fibrous material and hot chemical liquor, then flowing hot chemical liquor through the relief branch of the digester into an elevated pressure tank, automatically releasing acid gas from said tank and contacting the same with acid liquor to recover said gas, and introducing hot relief liquor from said tank into the upper portion of a digester while charging the latter with fibrous material, whereby said fibrous material is precooked and packed into the digester.

25. In an apparatus of the character described, an acid liquor storage tank, a pipe line having an interposed pump by means of which fresh acid liquor is forced into said storage tank a digester and a valved conduit connecting the upper portion of the digester to said pipe line, whereby liquor flowing through the pipe line acts to withdraw relief fluid from the digester through said conduit.

26. In an apparatus of the character described, a digester and an acid liquor storage tank, an acid liquor conveying pipe extending into the storage tank, a conduit connecting the upper portion of the digester to said liquor conveying pipe, a control valve for the conduit arranged adjacent to the upper portion of the digester, a valved branch connecting said conduit to the storage tank, and a valve interposed in the conduit between the branch and said liquor conveying pipe.

27. In an apparatus of the character described, a digester provided with a low pressure relief branch, a high pressure relief branch, and a side relief branch, and valved means for venting air from the low pressure relief branch into the atmosphere.

28. In an apparatus of the character described, a digester, an elevated side relief tank, a valved conduit connected to the side of the digester, and valved branches connecting said conduit to upper and lower portions of said tank.

29. In an apparatus of the character described, a digester having a valved side relief conduit, an elevated tank having top and bottom valved branches connected to said conduit, the major portion of said tank being arranged above said conduit, and a valved pipe connecting the top of the digester to said conduit.

30. In an apparatus of the character described, a digester having a valved side relief branch, an elevated pressure tank connected to said branch, and a valved conduit connecting said branch to the upper portion of said tank.

31. In an apparatus of the character described, a digester having a valved side relief branch, an elevated tank connected to said branch, a relief pipe for said tank, and a pressure operated valve arranged in the relief pipe.

32. In an apparatus of the character described, a digester having a valved side relief branch, an elevated tank connected to said branch, a pressure accumulator, a relief pipe connecting the upper portion of the tank to the lower portion of the accumulator, and a pressure operated valve interposed in the relief pipe.

33. In an apparatus of the character described, an acid liquor storage tank, a pipe line for conveying acid liquor to said storage tank, a pump interposed in said pipe line, a pressure accumulator, a conduit connecting the upper portion of the accumulator to the pipe line adjacent the suction side of the pump, and a pressure operated valve interposed in said conduit.

34. In a process of the character described, filling a digester with hot acid liquor and fibrous material, releasing hot acid gas and/or liquor from the upper portion of the digester and introducing the released fluid into an elevated pressure tank, and subsequently using the relief liquor from said pressure tank to pack fibrous material in a digester during the filling of the latter with such fibrous material.

35. In the digestion of fibrous material, filling a digester with hot acid liquor and fibrous material under pressure, releasing acid liquor from the top of the digester and introducing the same into an elevated pressure tank, releasing acid liquor through the side relief of the digester and depositing the same in said pressure tank, and subsequently using hot relief liquor from said tank to pack fibrous material into a digester and to precook the last mentioned fibrous material.

36. In the digestion of fibrous material, filling a digester with hot acid liquor and fibrous material, releasing acid fluid from the upper portion of the digester and introducing the same into an elevated pressure tank, and subsequently feeding hot relief liquor from said tank into a digester at various elevations while depositing fibrous material into the last mentioned digester for the purpose of packing and precooking the fibrous material in the last mentioned digester.

37. An apparatus for digesting fibrous material, including a digester having a valved top relief branch and a valved side relief branch, an elevated liquor relief tank, a conduit connecting said branches to said tank, and a pressure operated valve for releasing gas from said tank.

38. An apparatus for digesting fibrous material, including a digester, an elevated liquor relief tank, valved means connecting the upper portion of the digester to said relief tank, a conduit depending from said means, and valved branches arranged at different elevations and connecting said digester to said conduit.

39. In the digestion of fibrous material the method which comprises completely filling the digester containing the fibrous charge with liquor under a pressure at least approximating the desired cooking pressure by pumping said liquor into the digester, and introducing steam thereto to effect the cook while substantially maintaining such pressure.

40. In the digestion of fibrous material the method which comprises completely filling the digester containing the fibrous charge with acid liquor under a pressure at least approximating the desired cooking pressure, discharging a portion of the liquor without substantial fall of such pressure and introducing steam thereto to effect the cook while substantially maintaining such pressure.

41. In the digestion of fibrous material the method which comprises saturating the chips with acid liquor by an elevated pressure applied through a column thereof and thereupon introducing steam to effect the cook while maintaining a pressure substantially constant throughout the cooking period.

42. In the digestion of fibrous material the method which comprises saturating the chips with acid liquor by an elevated pressure pumped thereon through a column of said liquor, introducing steam to effect the cook while maintaining a pressure of several atmospheres and regulating the cooking pressure by relieving the same to maintain a substantially constant value during the cook.

43. In the digestion of fibrous material the method which comprises saturating the chips with liquor at a pressure substantially exceeding the cooking pressure and exerted by pumping applied through a column of the liquor and introducing steam to effect the cook while maintaining the pressure at least substantially at the desired cooking pressure and maintaining such pressure substantially constant throughout the period of the cook.

44. In the digestion of fibrous material, completely filling a digester with fibrous material and acid liquor while discharging air from the digester, then sealing the digester, and afterwards pumping acid liquor into the digester until the contents of the digester are placed under super-atmospheric pressure.

45. In the digestion of fibrous material, completely filling a digester with fibrous material and acid liquor while discharging air from the digester, then sealing the digester, and afterwards pumping acid liquor into the digester until the contents of the digester are placed under a super-atmospheric pressure of at least 15 pounds.

46. In the digestion of fibrous material, charging a digester with such material, then forcing acid liquor into the digester to completely fill the latter, discharging aeriform fluid from the digester during the filling, then sealing the digester and pumping acid liquor into the digester until the contents thereof reaches a super-atmospheric pressure.

47. In the digestion of fibrous material, that improvement which comprises charging a digester with fibrous material, then introducing into the digester a displacement medium including other gases and thereby driving off the air and inert gases from the digester into the atmosphere, and then subjecting the fibrous material in the substantially de-aerated digester to digestion with a cooking liquor.

48. In the digestion of fibrous material, that improvement which comprises charging a digester with fibrous material, then displacing the air and inert gases from the digester by introducing into the digester a displacement fluid including $SO_2$ gases, utilizing said $SO_2$ gases to de-aerate the fibrous material in the digester and to drive off air and inert gases to the atmosphere, and finally subjecting the fibrous material in the substantially de-aerated digester to digestion with acid liquor.

49. In the digestion of fibrous material, charging a digester with fibrous material, then introducing hot bisulphite acid liquor into the lower end of the digester and permitting acid gas to escape from the liquor in the digester, utilizing said gas to displace air and other inert gases from the digester and its contents during the introduction of the liquor and thereby permitting the fibrous material to absorb said acid gas whereby sulphurous acid is formed within the fibrous material, discharging air and inert gases from the upper portion of the digester into the atmosphere during the introduction of the acid liquor, and afterwards discharging $SO_2$ gas from the upper portion of the digester until the liquor completely fills the digester.

50. In the digestion of fibrous material, that improvement which comprises charging a digester with fibrous material, then displacing the air and inert gases from the digester by introducing into the latter a liquid displacement medium including another gas, utilizing the last-mentioned gas to de-aerate the fibrous material and to drive off air and inert gases to a region of lower pressure then is used in the digester during the cooking operation, and finally subjecting the fibrous material to digestion with a cooking liquor.

THOMAS L. DUNBAR.